A. Staley,
Steam Balanced Valve.
№ 70,283. Patented Oct. 29, 1867.
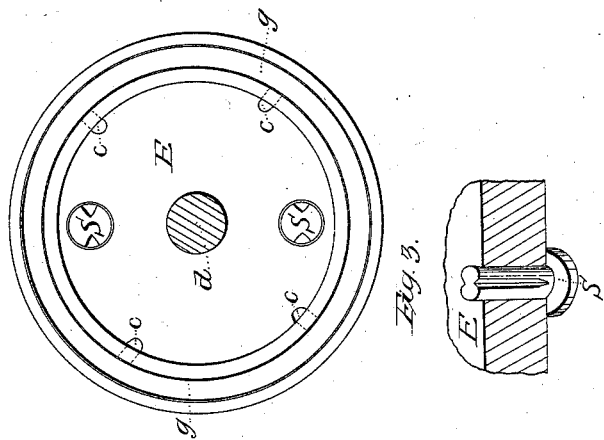
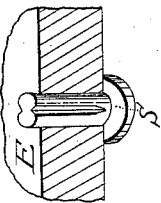
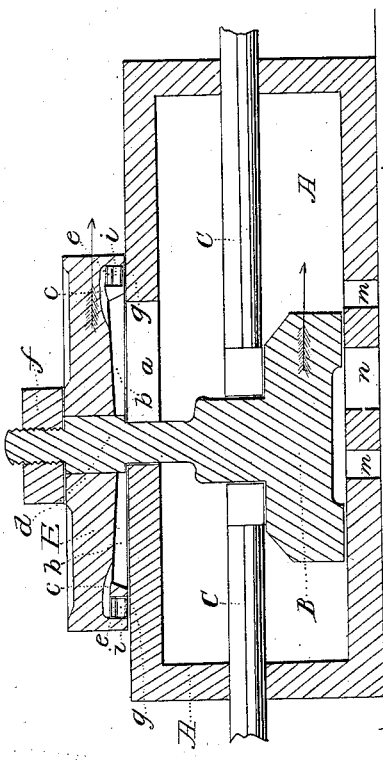
Witnesses
J. P. Dale
Geo. W. Miatt
Inventor
Albert Staley
by J. Fraser & Co.
Attys

United States Patent Office.

ALBERT STALEY, OF CLINTON, IOWA.

Letters Patent No. 70,283, dated October 29, 1867.

---

IMPROVEMENT IN STEAM-ENGINE SLIDE-VALVES.

---

*The Schedule referred to in these Letters Patent and making part of the same.*

---

TO ALL WHOM IT MAY CONCERN:

Be it known that I, ALBERT STALEY, of the city and county of Clinton, in the State of Iowa, have invented a certain new and useful Improvement in Balancing the Slide-Valves of Steam Engines; and I do hereby declare that the following is a full and exact description thereof, reference being had to the accompanying drawings, making part of this specification, in which—

Figure 1 is a central vertical section of a valve-chest and my improved valve.

Figure 2 is a plan of the inner surface of the disk E.

Figure 3 is a sectional perspective view of a portion of the disk E and relief-valve S.

Like letters of reference designate corresponding parts in all the figures.

My invention consists in the combination and arrangement of a disk on the outside of the valve-chest, attached to a stem or shank of any ordinary slide-valve, and reciprocating with it, the inner portion of the surface of the disk contiguous to the valve-chest being recessed, so as to afford space for the steam, which, by pressing outward against the disk, balances the valve, the perimeter of said disk being provided with packing-rings, to prevent the escape of the steam between the former and the valve-chest, all as hereinafter particularly set forth.

In the drawings, A represents a valve-chest provided with the usual ports, $m$ $m$ $n$. B, a slide-valve, with rods C C for actuating it. E is a disk secured on the end of a stem, $d$, on the outside of the valve-chest, by a nut, $f$, or other suitable means. The stem $d$ may be cast with the valve, and passes through a slot, $a$, in the top or outer plate of the valve-chest, which allows it to reciprocate with the valve. The area of the disk E is designed to be equal to that of the valve, or a little less, and is recessed on the under side, or side contiguous to the valve-chest, as shown at $b$, to afford a narrow space for the steam, which, passing through slot $a$, presses against the surface of the disk in a direction opposite from that of the valve-seat. This pressure, by counteracting that on the valve, relieves the pressure upon the valve-seat and balances the valve. To prevent the escape of the steam from the space $b$, between the disk and surface of the valve-chest, I construct the disk with a concentric rectangular groove in its face, near the outer edge, in which are fitted two metallic rings, $e$ $g$, with an intervening one, $i$, of fibrous or elastic packing material. Narrow passages $c$ $c$ are formed from the recess $b$ to the bottom of this groove beneath the rings, through which the steam enters, and by pressing the rings against the contiguous surface of the valve-chest, insures a reliable packing at all times.

The disk may be made of circular, rectangular, or other suitable form, as may be preferred, its functions and mode of operating remaining the same.

The great advantage of my improvement is that it relieves the pressure of the valve on its seat, and consequently from the wear between those surfaces which would otherwise result.

Should the ring $g$ become worn out from the friction between it and the valve-chest, it can readily be replaced by a new one, at a trifling cost, by simply unscrewing nut $f$ and removing the disk. The disk E is also provided with one or more oil-ducts, closed by suitable valves S, for lubricating the friction surface of the steam-chest.

What I claim as my invention, is—

The balancing disk E, of circular or other form, on the outside of the valve-chest, provided with packing $e$ $i$ $g$, in combination with the valve B and stem $d$, to which the said disk is attached, substantially in the manner and for the purpose set forth.

In witness whereof I have hereunto signed my name in the presence of two subscribing witnesses.

ALBERT STALEY.

Witnesses:
H. S. HYATT,
C. VAN KURAN.